United States Patent [19]

Anders

[11] Patent Number: 4,515,738

[45] Date of Patent: May 7, 1985

[54] METHOD OF MONITORING THE PRODUCTION OF EXTRUDED PROFILES AND AN APPARATUS INCORPORATING MEANS FOR EFFECTING SUCH MONITORING

[75] Inventor: Dietmar Anders, Hanover, Fed. Rep. of Germany

[73] Assignee: Hermann Berstorff Maschinenbau GmbH, Hanover, Fed. Rep. of Germany

[21] Appl. No.: 525,708

[22] Filed: Aug. 23, 1983

[30] Foreign Application Priority Data

Apr. 27, 1983 [DE] Fed. Rep. of Germany ....... 3315184

[51] Int. Cl.³ ............................................... B29F 3/00
[52] U.S. Cl. ................................. 264/40.7; 264/40.2; 425/131.1; 425/140; 425/141; 425/145; 425/190
[58] Field of Search ................... 264/40.7, 40.3, 40.1, 264/40.2; 425/140, 141, 131.1, 190, 145

[56] References Cited

U.S. PATENT DOCUMENTS

| | | | |
|---|---|---|---|
| 2,289,933 | 7/1942 | Rankin | 264/40.7 |
| 2,897,543 | 8/1959 | Weston et al. | 425/190 |
| 3,125,616 | 3/1964 | Cook et al. | 264/40.3 |
| 3,280,427 | 10/1966 | Smith | 425/190 |
| 4,087,499 | 5/1978 | Bayonnet | 264/40.7 |
| 4,095,156 | 6/1978 | Borisov et al. | 425/135 |
| 4,097,566 | 6/1978 | Bertin et al. | 264/40.7 |
| 4,137,025 | 1/1979 | Graves et al. | 264/40.7 |
| 4,329,133 | 5/1982 | Gallizia | 425/141 |
| 4,428,896 | 1/1984 | Stevenson | 264/40.7 |

FOREIGN PATENT DOCUMENTS

| | | |
|---|---|---|
| 2201631 | 8/1973 | Fed. Rep. of Germany . |
| 2742984 | 3/1978 | Fed. Rep. of Germany ..... 264/40.4 |
| 2304952 | 11/1976 | France ................. 425/141 |

Primary Examiner—Jeffery Thurlow
Attorney, Agent, or Firm—Schwartz, Jeffery, Schwaab, Mack, Blumenthal & Koch

[57] ABSTRACT

A method of monitoring the production of extruded composite profiles by an extrusion head fed by a plurality of worm extruders in which, immediately after the profile has been extruded, it is monitored by spacing measurement devices which determine the spacing between the devices and the profile. The measured spacing is then transmitted to a regulator or governor and compared with a pre-selected value. The governor or regulator controls the worm speed of the individual extruders and, if the measured value differs from the pre-selected value, alters the worm speed of one or more of the individual extruders until the measured value is the same as the pre-selected value.

8 Claims, 3 Drawing Figures

METHOD OF MONITORING THE PRODUCTION OF EXTRUDED PROFILES AND AN APPARATUS INCORPORATING MEANS FOR EFFECTING SUCH MONITORING

FIELD OF THE INVENTION

The present invention relates to a method and apparatus for producing extruded profiles from rubber or plastics material mixtures. Such a profile could, for example, be a tread strip for an automotive vehicle tire.

DESCRIPTION OF THE PRIOR ART

In German Patent Specification No. 2 201 631, there is disclosed an apparatus for producing tread strips from two different rubber mixtures. Two worm presses are disposed one above the other to feed the mixtures in an extrusion head in which the material is combined and extruded. The extruded tread strip thus produced is conducted over a conveyor-type weighing device on which the quantity of extruded material is weighed. If the measured weight deviates from a desired weight, the rate of the transfer of the tread strip is modified accordingly. Thus, if the measured weight is too high, the rate of transfer is increased so that the weight of the material on the conveyor is reduced due to elongation thereof.

In practice, therefore, apparatuses for producing tread strips operate with a discharge rate which is slightly higher than necessary and the extruded tread strip is brought to its desired weight by slightly increasing the withdrawal or transfer rate (compared with the rate at which the extruded tread strip emerges from the nozzle).

As a regulating facility, such an arrangement merely provides the possibility of lengthening or shortening the extruded tread strip by increasing or reducing the withdrawal speed. The rate at which the tread strip emerges from the nozzle is regarded as the minimum rate of the tread strip withdrawal or transfer means and for the purposes of regulating the profile thickness, the withdrawal or transfer means was not allowed to operate below such minimum speed.

Regulation by means of a desired weight conveyor-type weighing device is, however, effected too slowly to be of great practical use. If, for example, the weighing device indicates that the tread strip is too heavy, a long portion of unusable tread strip is produced as is a considerable amount of excess profile material before the fault can be corrected.

However, a greater disadvantage is seen to reside in the fact that a conveyor-type weighing device can only measure the total weight of the extrusion output, without providing any means for detecting the individual output weights from each extruder. The rate of withdrawal is increased when, for example, the lower extruder which extrudes the lateral walls of a vehicle tire, discharges too much material, such excess being detected by the conveyor-type weighing device.

This measure does, in fact, permit the desired overall weight of the tread strip to be regained after a period of time but is achieved at the expense of the second extrusion mixture discharged from the upper extruder which produces the tread surface of the vehicle tire.

Despite the fact that the desired overall weight of the tread strip is maintained in this manner, the individual components may still not be in the correct proportions relative to one another and this may lead to the vehicle tire being considerably weakened. Moreover, since conventional tread strips for vehicle tires are made from three or more different mixtures, even a satisfactorily operating conveyer-type weighing device does not produce acceptable results for ensuring that the tread strip produced contains the correct proportions by weight of the individual components from which it is formed.

OBJECTS OF THE INVENTION

The present invention, therefore, seeks to provide a method and apparatus which permits the monitoring and control both of the total quantity of the tread strip and the quantities of the individual mixtures which are combined in the extrusion head to form the tread strip.

In addition, the present invention seeks to provide a method and apparatus in which the quantities of the individual extruded mixtures can be rapidly increased or reduced by, for example, acting on the output quantities of the individual extruders.

SUMMARY OF THE INVENTION

According to the present invention, there is provided a method of monitoring the formation of composite profiles from mixtures of rubber or thermoplastics material by extrusion from an extrusion head which is fed with components of the mixture from a plurality of worm extruders wherein, after swelling, the profile emerging from the extrusion head is scanned by means of spacing measurement devices located immediately downstream of the nozzle outlet of the extrusion head, comparing the measured spacing with a desired value, and altering the worm speed of one or more of the individual extruders so as to cause the measured spacing to return to the desired value.

Preferably, the scanning is effected on both sides and from above and below the extruded profile.

According to another aspect of the present invention, there is provided a method of monitoring the formation of composite profiles by extrusion substantially as hereinbefore described.

In such an apparatus, spacing measurement devices are disposed between a support roller for the extruded profile and the nozzle outlet from which the profile is extruded. Such devices scan desired regions of the profile, generally at least one region made from each of the components. By so doing, it can be detected immediately, in a contact-less manner, if any such region is thinner or thicker than desired. This, in turn, means that one or more of the individual extruders is producing too small or too great an output. The support means for supporting the emergent profile prevents elongation thereof as a result of gravity. Such elongation would, of course, cause the resultant measurements to be incorrect.

Very rapid action can then be taken with regard to the correction of the output of any particular extruder by modifying the worm speed of that extruder. Because the flow channels in the profile head are only short and rubber, like a hydraulic fluid, is not easily compressible, the idling time is reduced to a minimal level.

The amount of the change in output, that is to say, the change in the worm speed, is generally only minimal. When the apparatus is operated, the desired profile is initially processed having regard to the thicknesses of the individual components. Only when all three mixture components are present in their correct thickness are the spacing measuring devices locked at a predetermined spacing from the profile. This set spacing is fed into a governor or regulator as a desired value. The spacing measuring operation may, for example, be effected by means of a pneumatic dynamic pressure transmitter or by ultrasonic devices.

The regulator or governor is then programmed so that, assuming penumatic dynamic pressure transmitters are being used, the appropriate extruder speed or worm speed is altered when a pressure deviation is detected from one of the transmitters. Thus, if there is a drop in the detected pressure from one another, this means that the spacing between the dynamic pressure transmitter and the profile passing therebeneath has increased and therefore the particular portion of the profile being scanned is too thin. Accordingly, the worm speed of the appropriate extruder is increased to supply more of the deficient material. Increasing the extruder speed causes the output of such extruder to be increased and the profile thickness to return to its desired value. Obviously, if an increase in pressure is detected then the spacing is too small and the worm speed of the appropriate extruder is reduced until the correct thickness is re-established.

Since the dynamic pressure transmitter can detect spacing as small as 0.1 mm, extremely accurate monitoring is achieved. The advantages of using dynamic pressure transmitters, such as their reliable operation even when a relatively large amount of dirt is present or when the ambient temperature is high and the fact that they are unaffected by magnetic influences and sound waves, thus become apparent.

BRIEF DESCRIPTION OF THE DRAWINGS

One embodiment of the present invention will be further described, by way of example, with refernece to the accompanying drawings, in which.

DESCRIPTION OF THE PREFERRED EMBODIMENT

Figure 1:
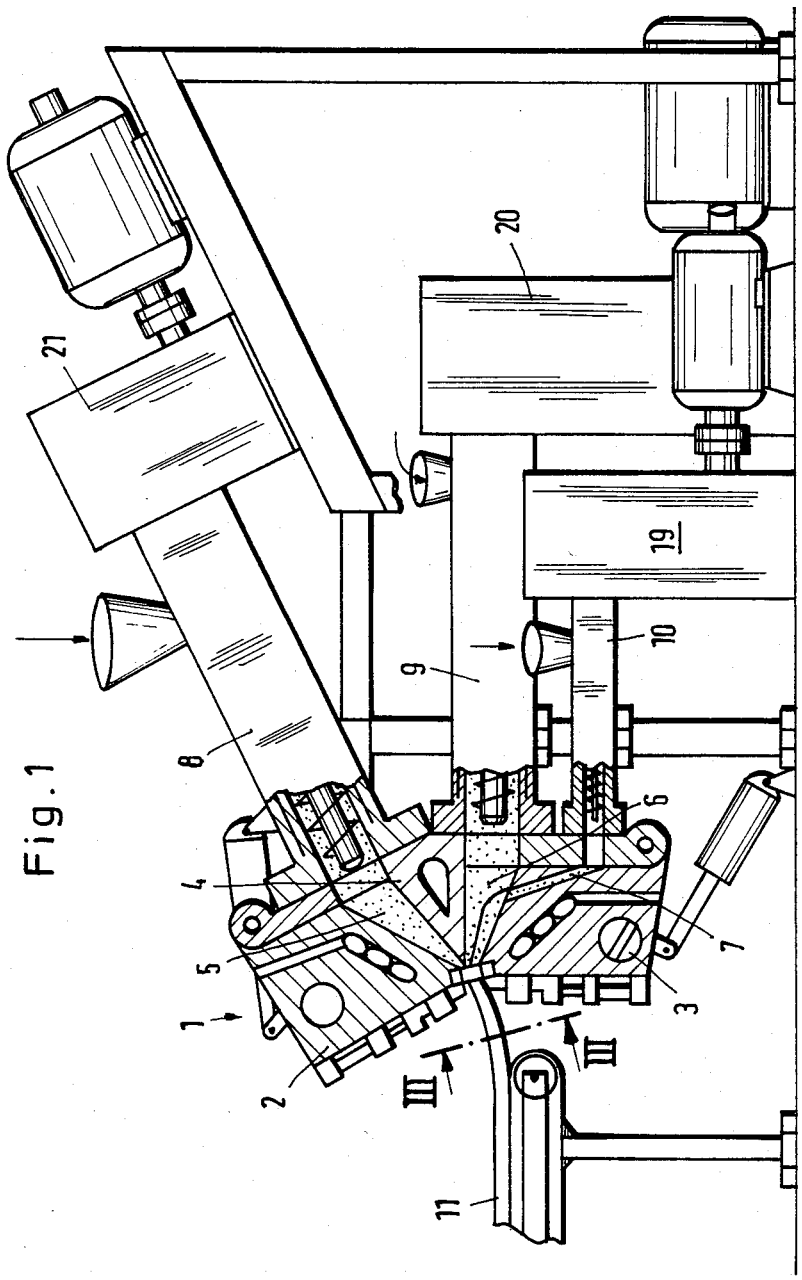
FIG. 1 is a schematic longitudinal, sectional illustration of a profile extrusion apparatus in accordance with the present invention and the profile extruded thereby.

In FIG. 1 there is shown an extrusion head 1 suitable for extruding profiles such as tread strips for automotive vehicle tires. The head comprises pivotable upper and lower portions 2 and 3 respectively and a fixed central portion 4.

In the extrusion head, there are defined flow channels 5, 6 and 7. The channel 5 receives material to be extruded from an extruder 8 driven by a drive mechanism 21, flow channel 6 receives material from an extruder 9 driven by a drive mechanism 20, and flow channel 7 receives material from an extruder 10 driven by a drive mechanism 19.

Figure 2:
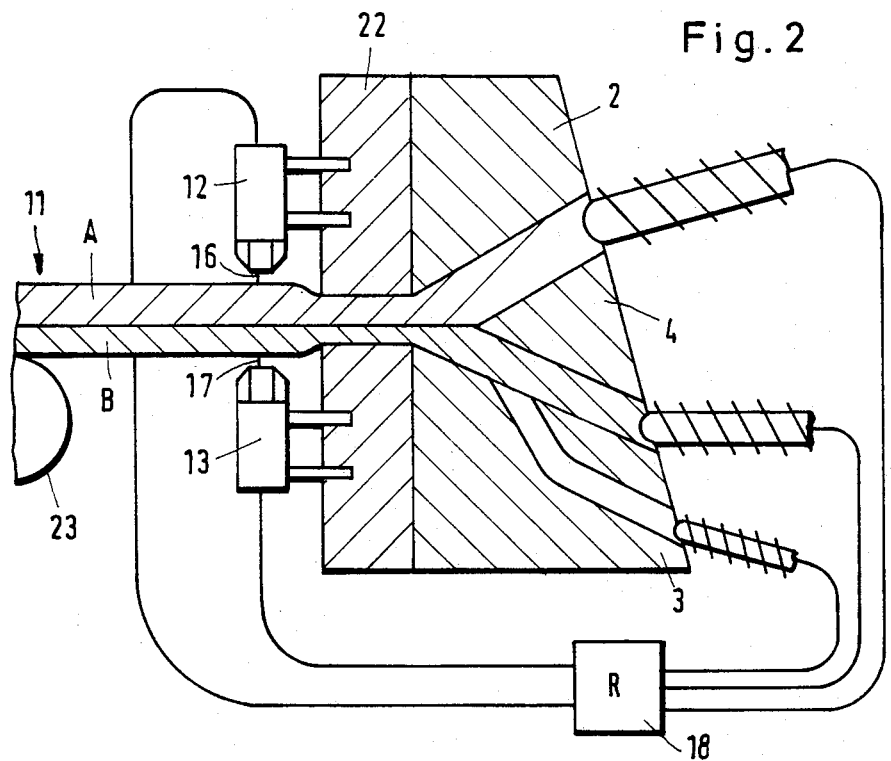
FIG. 2 is a longitudinal, sectional view through the extrusion head of the apparatus shown in FIG. 1 and also showing a regulating circuit associated therewith.

In the longitudinal, sectional view of FIG. 2, two dynamic pressure transmitters 12 and 13 can be seen. These transmitters are disposed directly downstream of, and as close as possible to, the nozzle outlet 22, between such outlet 22 and a profile support and transfer roller 23. The tranmsitters 12 and 13 are connected to a regulator or governor 18 which, in turn, is connected to the drive mechanisms 19, 20 and 21 for the extruders 10, 9 and 8 respectively. The roller 23 prevents the extruded profile 11 from elongating.

Figure 3:
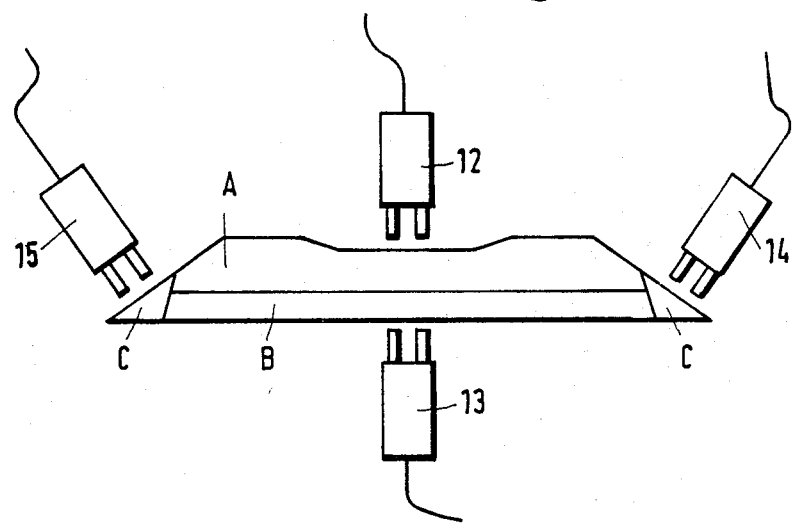
FIG. 3 is a cross-sectional view through an extruded profile and also shows dynamic pressure transmitters forming part of the regulating circuit shown in FIG. 2.

Two further pressure transmitters 14 and 15 are present and these can be seen in FIG. 3 although they are invisible in FIG. 2. These transmitters 14 and 15 are also connected to the regulator or governor 18 and thence to one of the drive mechanisms. FIG. 3 shows a tread strip extruded from these components A, B and C and it will be noted that the transmitter 12 is associated with the component A, transmitter 13 with component B and transmitters 14 and 15 with component C. Component A is, in most cases, a base for the tread strip and is a softer material than the tread surface. Component B forms the tread surface and must be of a wear resistant nature. Component C forms the lateral surfaces of the tread strip and is of a highly compressible material.

The transmitters 12, 13, 14, 15 may be mounted on other fixed parts of the extrusion head as long as they are directly at the extruded profile immediately downstream of the nozzle outlet 22 at the place where the profile has just completed its swelling process. The extent of the swelling of the extruded profile is dependent upon the viscosity of the mixture being extruded and upon the relative ratios of the amounts of the individual mixtures used relative to one another.

In use, the three extruders 8, 9 and 10 are supplied with their respective mixtures and set in motion. The extruded profile 11 emerging from the nozzle is examined with regard both to its overall cross-section and to the three components of the mixture. The profile is then brought to its desired thickness by increasing or reducing the worm speed of one or more of the extruders 8, 9 or 10. This, of course, means that the output of the individual mixtures is varied.

The dynamic pressure transmitters 12, 13, 14 and 15 are then located at a relatively small, pre-determined spacing from the profile 11 and locked in position.

Subsequently, the dynamic pressure of each of the emergent air streams is measured and the pressures which have thus been determined for the specific profile being produced is fed to the regulator or governor 18 as the set pressure. This pressure measurement is, of course, an indication of the spacing between the transmitter and its associated component of the profile. The regulator or governor 18 is simultaneously programmed so that, if slight deviations in any of these pressures occur, for example, a deviation as small as two millibars, the governor or regulator causes the worm speed of the extruder of that component to be modified so that the set pressure is re-established. It is easy to determine by experimentation the amount of alternation to the worm speed, and hence the extruder discharge, to cause the desired value to be re-established and hence for the correct profile to be produced.

If the pressure of a dynamic pressure transmitter drops, for example, this means that the spacing between that transmitter and its associated component of the profile has become enlarged. The regulator or governor 18 will, therefore, slightly increase the worm speed of the appropriate extruders 8, 9 or 10 in order to permit a return to the desired thickness of the profile 11.

Such apparatus can, therefore, operate substantially completely automatically, and it should be particularly noted that the thickness and overall dimensions of the individual profile components are monitored accurately without necessitating the use of a complex and costly conveyor-type weighing system.

I claim:

1. A method of monitoring the formation of composite profiles from mixtures of rubber or thermoplastics materials comprising the steps of
   (a) supplying components of said mixture to an extrusion head from individual worm extruders;
   (b) extruding said mixture through a nozzle outlet of an extrusion head to form a profile;
   (c) permitting said profile to swell;
   (d) scanning both sides and the top and bottom of said profile emerging from the extrusion head by means of spacing measurement devices located immediately downstream of the nozzle outlet of the extrusion head;
   (e) comparing said measured spacing with a desired value, and
   (f) modifying the worm speed of one or more of the individual extruders to cause said measured spacing to return to said desired value.

2. An extrusion apparatus for producing composite profiles having at least three parts including a base, a tread strip, and separate lateral strips at the sides of said tread strip, from mixtures of rubber or plastics materials comprising:
   (a) at least three worm extruders, each said extruder conveying one component of said composite profile;
   (b) a drive mechanism associated with and driving each said extruder;
   (c) an extrusion head into which each said extruder conveys its component, said extrusion means comprising profile nozzle means, said composite profile being extruded from said extrusion head through said profile nozzle means;
   (d) spacing measurement means disposed downstream of said nozzle means, said spacing measurement means being located at both sides and the top and bottom of said profile and being located at a pre-selected spacing from the base, tread strip and lateral strips emerging from said nozzle means;
   (e) support means located downstream of said spacing measurement means for supporting the extruded composite profile, and
   (f) a regulating means connected to each said drive mechanism for each said individual extruder, said regulating means acting on each of said drive mechanisms to modify the flow rate from said individual extruders in response to signals transmitted from said spacing measurement means to said regulating means.

3. An extrusion apparatus as recited in claim 2, in which said spacing measurement means are in the form of pneumatic dynamic pressure transmitters.

4. An extrusion apparatus as recited in claim 2, in which said spacing measurement means are in the form of ultrasonic transmitters and receivers.

5. An extrusion apparatus as recited in claim 2, in which one said spacing measurement means is associated with each said extruder drive means, said regulating means being provided between said measurement means and said drive mechanism.

6. An extrusion apparatus as recited in claim 2, in which said spacing measurement means are operatively mounted on said extrusion head so as to be radially displaceable relative to said extruded composite profile and so as to be lockable thereon.

7. An extrusion apparatus as recited in claim 2, in which said extrusion head includes profile rails, said spacing measurement means being operatively mounted on said profile rails so as to be radially displaceable relative to said extruded composite profile and so as to be lockable thereon.

8. An extrusion apparatus as recited in claim 2, in which said support means for supporting said emergent profile comprises a roller, said spacing measurement means being disposed between said nozzle outlet and said roller.

* * * * *